United States Patent Office 3,636,150
Patented Jan. 18, 1972

3,636,150
PROCESS FOR PREPARING CELLULOSE ESTER REVERSE OSMOSIS MEMBRANES ON FLEXIBLE WEBS HAVING ENHANCED RELEASABILITY
Martin E. Rowley, Hilton, and Walter D. Slowig and Carl F. Smith, Rochester, N.Y., assignors to Eastman Kodak Company, Rochester, N.Y.
No Drawing. Filed Nov. 28, 1969, Ser. No. 880,905
Int. Cl. B29c *1/04;* B29d *27/04;* B44d *5/02*
U.S. Cl. 264—41                            5 Claims

ABSTRACT OF THE DISCLOSURE

It has been found that when flexible webs (such as those of polymeric films having good dimensionable stability and substantially no solubility in the dope systems being used) are utilized as temporary supports upon which cellulose ester dope solutions are cast in the manufacture of "reverse osmosis" membranes, the resulting gelled membranes are ordinarily difficult to remove from the flexible web. Dramatically enhanced releasability of the gelled membranes from such flexible supports results if the surface of the flexible support is first made very hydrophylic.

---

The present invention relates to improved methods for preparing reverse osmosis membranes made from cellulose ester dopes. More particularly, this invention relates to improved procedures for casting and subsequently (immediately after casting) handling films of cellulose ester, such as cellulose acetate, that are intended for use as "reverse osmosis" membranes.

Although the manufacture of "reverse osmosis" membranes has been commercially practical for only a relatively short time, it has been ascertained with a fairly high degree of certainty that the processes of Loeb et al., as generically described in U.S. Pats. 3,344,214, 3,133,132 and 3,283,042 represent perhaps the most economical methods for manufacturing such membranes. Such generic processes require the steps of:

(a) casting on a fairly smooth web a layer of a "dope" solution comprising a cellulose ester film forming material, one or more volatile solvents for the cellulose ester, and at least one water-soluble "pore producing material";

(b) subjecting the resulting film to a relatively short "drying" period (in which a small amount of the volatile solvent is evaporated from the surface of the cast dope layer to thereby form a so-called "active," relatively more dense layer at the surface of the membrane);

(c) thereafter immersing the partially "dried" layer into an aqueous system in which both (i) the volatile solvent system and (ii) the "pore producing material" are soluble, to thereby extract most of (i) and (ii) from the partially dried layer and cause the cellulose ester to "gel," and form a "set" film; and (d) optionally subject the resulting wet "set" film to a heat-treating step to thereby improve the salt exclusion property of said "set" film.

Whereas the Loeb et al. disclosures involve the use of batch-wise operations in their examples it would be an obvious expedient to adapt the Loeb et al. batch-wise procedures to continuous operations in which the "dope" solution is simply cast on a moving web such as a smooth, dimensionally stable, water insoluble polymer film or a smooth metal belt, the resulting cast liquid is moved for a brief period of time through an area in which the liquid is exposed to an atmosphere into which some of the volatile solvent (in the case liquid layer) can be evaporated, and then directing the moving web, immediately after the "partial drying" step, into a pool of the aqueous solution (to "set" or "gel" the cellulose ester in the cast liquid, and extract most of the solvent(s) and the "pore producing material" from the resulting "set" film). After the film has been "set" it can be removed from the movable web (upon which the "dope solution" had originally been cast), by simply stripping it therefrom, because at this point, the "set" membrane film layer theoretically has sufficient internal, integral strength to hold itself together. After being stripped from the moving web, the wet membrane can then be heat treated ("annealed") or rolled up for future processing, as desired.

Although the wet "set" membrane theoretically has developed sufficient integral strength (after it is subjected to the aqueous leaching bath for several minutes and thereby caused to "gel" extensively) to be readily removable from the moveable web upon which it had originally been cast, it has been found that when a polymeric film such as poly(ethylene terephthalate), polypropylene or the like is used as the "moveable web," the "set" membrane actually adheres to the polymeric web with sufficient tenacity to result in uncontrolled tearing of the "set" membrane film when it is pulled from the polymeric "moveable web" (even while the separation takes place under the surface of an aqueous bath). The ready expedient of using a "doctor" blade to aid in the separation is only a temporary answer, because the blade has to be cleaned frequently, necessitating shut-down or other disruption of the equipment.

It has now been discovered that the problem of excessive adherence between the dimensionally stable polymeric films useful as webs upon which the cellulose ester dopes can be cast is caused by the fact that the surfaces of such polymeric films are almost always very hydrophobic in nature. As a result, the problem can be solved by providing a fairly hydrophilic surface (on the dimensionally stable polymeric web) upon which the cellulose ester dope solution is cast. This is surprising in view of the fact that the technique of making the surfaces of such polymeric webs (such as polyolefin and polyester webs and the like) more hydrophylic heretofore has generally been used to cause layers of materials to adhere to the polymeric webs more strongly. The degree of hydrophilicity to which the surfaces of the "polymeric webs" useful in this invention must be converted is represented by the well-known measurement of "contact angle" (of a drop of distilled water with the surface of the "polymeric web"). Those that are useful in the practice of this invention must have a "contact angle" (at 25° C.) of at most about 55 degrees.

The polymeric webs that are particularly useful for the purpose of providing a smooth base upon which the layer of dope solution can be cast in accordance with generic processes for manufacturing high quality, uniform "reverse osmosis" membranes must be extremely resistant to losses in dimensional stability such as wrinkling, stretching, softening and the like when it is in contact with the dope solutions themselves, the aqueous "leaching" baths, and temperature changes of as much as 30° C. or more during the various processing steps. Typical examples of useful polymeric films are the biaxially oriented, heat set polyesters such as poly(ethylene terephthalate) and poly(1,4-cyclohexylenedimethylene terephthalate) and related copolyesters, and biaxially oriented polyolefins such as high density (0.94 to 0.97 g./cc.) polyethylene, polypropylene, and the like, as well as films of heat-treated cellulose triacetate (having at least 43% acetyl). Unfortunately, these "dimensionally stable" films all have naturally very hydrophobic surfaces. Thus, in order to be used in the practice of this invention at least one of their surfaces must be made more hydrophylic (by comparison with its natural hydrophobicity). Fortunately, methods are known for making the surfaces of such films sufficiently hydrophylic to be useful in the successful practice of this invention. Thus, the surface(s) can be treated chemically (as by hydrolyzing the surface of cellulose triacetate film with an aqueous solution of strong alkali), by partially saponifying the surface of a polyester web by a similar treatment, by subjecting the surface of a polyester or a polyolefin film to an electrical or radioactive corona discharge, or by applying to the surface of any such "hydrophobic" polymeric webs a hydrophylic coating such as a coating of a blend of gelatin and cellulose nitrate, a coating of gelatin, from which the dope solution is cast, and then, immediately thereafter, through an area in which the layer is exposed to air for a short time (less than 30 seconds). Then the layer is run directly into a large pool of cool (34° F.) water, whereupon the layer "sets" almost immediately. After moving in the water bath for 50 seconds, the "set" layer of cellulose acetate film is stripped from the moving "polymeric web." The ease of such stripping is observed and recorded. Results of this test with various polymeric webs, some treated in accordance with the present invention, are listed in Table I, below. "Contact angles" are measured in accordance with the procedure of H. Schonhorn as published in "Nature," volume 210, page 896 (1966).

TABLE I

| No. | Polymeric web material | Surface treatment | Amount of coating (mg./sq. ft.) | Strippability | Contact angle, degree |
|---|---|---|---|---|---|
| 1 | Poly(ethylene terephthalate) | None | | Very poor | 71 |
| 2 | do | Rough finish (mechanical) | | do | |
| 3 | do | Gelatin | | Excellent | 40 |
| 4 | do | Alkali treated [1] | | Good | |
| 5 | High density polyethylene | None | | Very poor | 110 |
| 6 | do | Electron bombardment [2] | | Excellent | 55 |
| 7 | Polypropylene | None | | Very poor | |
| 8 | do | Electron bombardment [2] | | Good | 50 |
| 9 | Cellulose triacetate | None | | Very poor | 60 |
| 10 | do | Alkali hydrolysis [3] | | Excellent | 31 |
| 11 | do | Gelatin | 90–150 | do | 40 |
| 12 | do | Sodium ethyl cellulose sulfate | 30–60 | do | |
| 13 | do | Polyvinyl alcohol | 90–150 | do | |
| 14 | do | {1—gelatin/cellulose nitrate:50/50 / 2—gelatin} | 60–60 / 90–150 | do | 40 |
| 15 | Poly(ethylene terephthalate) | MaVclt terpolymer [4] plus gelatin overcoat | 60–90 | do | 40 |

[1] Treated for 600 seconds with 10 weight percent NaOH in water at 70° C.
[2] By passing film between a highly charged bar electrode and a grounded metal roll.
[3] Treated for 1 minute with 5 weight percent of NaOH in methyl alcohol and water (60–40) at 180° F.
[4] 83% vinylidene chloride, 15% methyl methacrylate and 2% itaconic acid.

a coating of a hydrophylic copolymer of vinylidene chloride, methyl methacrylate and itaconic acid or any of a number of other hydrophylic coatings which are well known in the art under the conventional terminology of "subs" or "U-coats." Actually, any method that results in the surface of the hydrophobic, dimensionally stable polymeric web being made sufficiently hydrophylic to pass the "contact angle" test (described in Example I, below) can be used in the successful practice of this invention, so long as the desired dimensional stability, flexibility and smoothness of the "polymeric web" is not destroyed thereby. Typical examples of preferred coatings for cellulose triacetate webs include sodium ethyl cellulose sulfate, polyvinyl alcohol and gelatin, while a preferred terpolymeric coating for poly(ethylene terephthalate) includes vinylidene chloride (from about 75 to about 96 weight percent), methyl methacrylate (from about 4 to about 20 weight percent), and itaconic acid (from about 1 to about 5 weight percent), followed by an overcoat of gelatin. From these examples, those skilled in the art will recognize that many other hydrophylic coating materials can be readily substituted for those specific ones set out above. Actually, any such hydrophylic coating material can be used advantageously in the present processes.

In the following examples, all "parts" are by weight unless otherwise specified.

EXAMPLES

In a conventional stainless steel mixer are blended for several hours the following ingredients:

100 parts cellulose acetate (39.8% acetyl, I.U. 1.5)
180 parts acetone
120 parts formamide The result is a typical cellulose acetate dope solution.

This dope solution is cast in a layer 0.10 inch thick onto the dope surface of a flat, moving web of polymer that is being tested. The moving polymeric web is run continuously, at a rate of 2–20 feet per minute, under a hopper Although only one type of cellulose ester dope solution was utilized to illustrate the present invention in the foregoing examples, similar beneficial results can be obtained from the use of other conventional "reverse osmosis" casting dopes.

The invention has been described in detail with particular reference to preferred embodiments thereof, but it will be understood that variations and modifications can be effected within the spirit and scope of the invention.

What is claimed is:

1. In a process for manufacturing cellulose ester membranes suitable for use in reverse osmosis processes, which process comprises the steps of
   (a) casting a dope solution of said cellulose ester dissolved in at least one organic solvent which is miscible with water onto the surface of a moving web of elongated polymeric film selected from the group consisting of polyester, and polyolefin films;
   (b) evaporating a portion of said organic solvent from the resulting cast layer of dope;
   (c) thereafter diverting the moving elongated film on which is coated the resulting partially evaporated layer of dope into a water bath to thereby cause said partially evaporated layer of dope to gel and form a wet membrane; and
   (d) thereafter separate the resulting wet membrane from said moving elongated polymeric film;
the improvement which comprises casting said dope solution onto said elongated polymeric film that has been treated to make the surface onto which said dope solution is cast sufficiently hydrophilic to yield a contact angle, with water, of at most about 55°.

2. An improved process as in claim 1, wherein said moving web is poly(ethylene terephthalate) coated with a thin layer of a copolymer containing from about 75 to about 96 weight percent vinylidene chloride, from about 4 to about 20 weight percent methyl methacrylate and from about 1 to about 5 weight percent of itaconic acid.

3. An improved process as in claim 1, wherein said moving web is high density polyethylene; said surface of said web having been made hydrophilic by being electron bombarded.

4. An improved process as in claim 1, wherein said moving web is poly(ethylene terephthalate) that has had said surface hydrolyzed by contacting said surface with a solution of a strong base.

5. An improved process as in claim 1, wherein said moving web is polypropylene; said surface of said web having been made hydrophilic by being electron bombarded.

References Cited
UNITED STATES PATENTS

| | | | |
|---|---|---|---|
| 3,271,178 | 9/1966 | Nadeau et al. | 117—138.8 F X |
| 3,284,232 | 11/1966 | Caldwell | 117—138.8 F |
| 3,322,553 | 5/1967 | Seifried et al. | 117—138.8 F |
| 3,394,023 | 7/1968 | Wilhelm | 117—138.8 FX |
| 3,399,073 | 8/1968 | Caldwell et al. | 117—138.8 F X |
| 2,514,131 | 7/1950 | Kaszuba | 264—338 |
| 2,622,278 | 12/1952 | Eckler et al. | 264—338 |
| 2,648,097 | 8/1953 | Kritchever | 204—159.2 X |
| 2,866,717 | 12/1958 | Bristol | 264—338 X |
| 2,877,500 | 3/1959 | Rainer et al. | 264—22 |
| 2,939,956 | 6/1960 | Parks | 161—Irradiation Digest |
| 2,940,869 | 6/1960 | Graham | 161—Irradiation Digest |
| 2,974,061 | 3/1961 | Duerr | 264—338 X |
| 2,994,111 | 8/1961 | Koss et al. | 264—338 X |
| 3,432,585 | 3/1969 | Watson et al. | 264—49 |
| 3,503,773 | 3/1970 | Bisschops et al. | 264—338 X |
| 3,522,335 | 7/1970 | Rowley | 264—49 |

OTHER REFERENCES

Little K. "Irradiation of Linear High Polymers," In Nature, vol. 170, No. 4338, Dec. 20, 1952, pp. 1075–1076.

Sun, K. H. "Effects of Atomic Radiation on High Polymers," In Modern Plastics, September 1954, pp. 141–144, 146, 148, 150.

Alexander, P. "The Effect of Oxygen on the Changes Produced by Ionizing Radiations in Polymers," Letters to the Editors, Journal of Polymer Science, vol. XXII, issue No. 101, November 1956, pp. 343–348.

PHILIP E. ANDERSON, Primary Examiner

U.S. Cl. X.R.

117—138.8 F; 161—159, 412; 204—159.2; 210—490, 500; 264—22, 217, 338, 340